(12) United States Patent
Scaife et al.

(10) Patent No.: US 7,841,172 B2
(45) Date of Patent: Nov. 30, 2010

(54) METHOD AND SYSTEM FOR MAINTAINING AFTERTREATMENT EFFICIENCY

(75) Inventors: Mark Scaife, Metamora, IL (US); Trent Cleveland, Metamora, IL (US); Michael Lowe, Metamora, IL (US); Cornelius Opris, Peoria, IL (US); Evan Jacobson, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 852 days.

(21) Appl. No.: 11/806,358

(22) Filed: May 31, 2007

(65) Prior Publication Data

US 2008/0295483 A1  Dec. 4, 2008

(51) Int. Cl.
*F01N 3/00* (2006.01)
*F01N 3/02* (2006.01)
*F02B 27/04* (2006.01)

(52) U.S. Cl. .............................. 60/297; 60/273; 60/277; 60/295; 60/311

(58) Field of Classification Search ................... 60/273, 60/277, 295, 297, 311
See application file for complete search history.

(56) References Cited

U.S. PATENT DOCUMENTS

| | | | |
|---|---|---|---|
| 5,110,747 A | 5/1992 | Pataschnick et al. | |
| 5,195,316 A | 3/1993 | Shinzawa et al. | |
| 5,196,170 A | 3/1993 | Patashnick et al. | |
| 5,279,970 A | 1/1994 | Patashnick et al. | |
| 5,401,468 A | 3/1995 | Patashnick et al. | |
| 6,622,480 B2 * | 9/2003 | Tashiro et al. ................. | 60/295 |
| 6,829,890 B2 | 12/2004 | Gui et al. | |
| 6,928,809 B2 | 8/2005 | Inoue et al. | |
| 6,941,750 B2 | 9/2005 | Boretto et al. | |
| 6,989,045 B2 | 1/2006 | Bailey et al. | |
| 7,065,960 B2 | 6/2006 | Gioannini et al. | |
| 7,188,512 B1 | 3/2007 | Wills | |
| 2004/0200198 A1 * | 10/2004 | Inoue et al. ................. | 55/282.3 |
| 2006/0005534 A1 * | 1/2006 | Wirth et al. ................... | 60/291 |

(Continued)

FOREIGN PATENT DOCUMENTS

EP  1103702  5/2001

(Continued)

OTHER PUBLICATIONS

Southwest Research Institute, Technical Proposal, Diesel Aftertreatment Sensitivity to Lubricants (DASL) and Non-Thermal Catalyst Deactivation (N-TCD), Jun. 13, 2001 (54 pages).

(Continued)

*Primary Examiner*—Thomas E Denion
*Assistant Examiner*—Audrey Klasterka
(74) *Attorney, Agent, or Firm*—Finnegan, Henderson, Farabow, Garrett & Dunner LLC

(57) ABSTRACT

A method is provided for compensating for variability in ash accumulation rates within an aftertreatment element of an engine exhaust system. The method includes determining flow resistance values through the aftertreatment element and tracking minimum flow resistance values over time. The method also includes correlating the tracked minimum flow resistance values over time, with a model of engine oil consumption rate that is based on predetermined values for model engine oil consumption. The method further includes adjusting the predetermined values based on the tracked minimum flow resistance values over time.

20 Claims, 2 Drawing Sheets

U.S. PATENT DOCUMENTS

| | | |
|---|---|---|
| 2006/0191258 A1* | 8/2006 | Opris .......................... 60/297 |
| 2007/0006577 A1* | 1/2007 | Yokoyama et al. ............ 60/297 |
| 2007/0056270 A1 | 3/2007 | Liimatta et al. |
| 2007/0056272 A1 | 3/2007 | Dollmeyer et al. |

FOREIGN PATENT DOCUMENTS

| | | |
|---|---|---|
| EP | 1387051 | 2/2004 |
| EP | 1460245 | 9/2004 |
| EP | 1467071 | 10/2004 |

OTHER PUBLICATIONS

Scaife et al., U.S. Patent Application filed May 31, 2007, entitled "Method and System for Maintaining Aftertreatment Efficiency." (29 pages).

* cited by examiner

METHOD AND SYSTEM FOR MAINTAINING AFTERTREATMENT EFFICIENCY

TECHNICAL FIELD

The present disclosure is directed to reducing particulate emissions and, more particularly, to methods and systems for maintaining efficiency of aftertreatment in reducing particulate emissions.

BACKGROUND

Engines, including diesel engines, gasoline engines, natural gas engines, and other engines known in the art, may exhaust a complex mixture of emissions. The emissions may include both gaseous and solid material, such as, for example, particulate matter. Particulate matter may include ash and unburned carbon particles generally referred to as soot.

Environmental concerns have resulted in the development of systems to treat engine exhaust. Some of these systems may employ exhaust treatment devices, such as particulate filters, to remove particulate matter from the exhaust flow. A particulate filter may include filter material designed to capture particulate matter. After an extended period of use, however, the filter material may become partially saturated with particulate matter, such as soot. This partial saturation may hinder the ability of the particulate filter to remove particulates from the exhaust flow.

A large portion of the collected particulate matter, e.g. soot, may be removed from the filter material through a process called regeneration. One way that regeneration may be accomplished is by increasing the temperature of the filter material, and the particulate matter in the filter material, above the combustion temperature of the particulate matter. The soot may be consumed by the heat of the regeneration process. However, a portion of the particulate matter, e.g. ash, may remain in the filter material and, over time, accumulate. As ash accumulates, the efficiency of the particulate filter to control emissions of particulate matter may be adversely affected.

Ash derives largely from engine lubricating oil that, unavoidably, finds its way into the engine combustion chambers, and is consumed during the combustion phase of engine operation. Different engine oil formulations contain varying amounts of ash. An engine that is lubricated by an oil formulation with a higher ash content will, all other factors being equal, place more ash into the engine exhaust system, and thus, into aftertreatment elements, such as, for example, a particulate filter. In addition, engine system failures, e.g. deteriorating piston rings, may result in higher than normal oil consumption and, hence, higher ash accumulation rates in an aftertreatment element.

It is desirable that there be some effective manner for compensating for variability in ash accumulation rates, and otherwise maintain particulate filter efficiency, by accounting for ash accumulation.

One regeneration system that accounts for ash accumulation is disclosed in U.S. Pat. No. 5,195,316, issued to Shinzawa et al. on Mar. 23, 1993 ("the '316 patent"). The '316 patent discloses embodiments that advance the timing of initiation of regeneration in accordance with the accumulated amount of incombustible residue in a particulate trap. The '316 patent discloses that it is possible to sample pressure differentials after regeneration and then determine the amount of accumulated incombustible residue. The frequency of regeneration can then be increased as the amount of incombustible residue increases in order to allow for the fact that the trap will tend to reach a fully charged state earlier than normal due to the incombustible residue that has accumulated.

While the system of the '316 patent contemplates varying regeneration frequency as ash accumulates, no provision is made for a correlation between tracked minimum flow resistance values through the particulate trap over time, with a model of engine oil consumption rate that is based on predetermined values for engine oil consumption. In addition, the system of the '316 patent does not contemplate adjusting the predetermined values of the model for engine oil consumption rate based on the tracked minimum flow resistance values. Accordingly, the system of the '316 patent may not properly take into account the impact of a major contributor to ash accumulation in a particulate trap. Not directly accounting for the impact of consumed engine oil, may result in inaccurate determination of remaining particulate trap volume, improperly timed servicing of the particulate trap for ash removal, and adverse effects on fuel consumption when ash accumulation has been underestimated.

The disclosed methods and systems for maintaining particulate filter efficiency are directed toward overcoming one or more of the problems set forth above.

SUMMARY OF THE INVENTION

In one exemplary embodiment of the present disclosure, a method of compensating for variability in ash accumulation rates within an aftertreatment element of an engine exhaust system is disclosed. The method includes determining flow resistance values through the aftertreatment element. The method also includes tracking minimum flow resistance values over time. The method further includes correlating the tracked minimum flow resistance values over time, with a model of engine oil consumption rate that is based on predetermined values for model engine oil consumption. The method also includes adjusting the predetermined values based on the tracked minimum flow resistance values over time.

In another exemplary embodiment of the present disclosure, a system of compensating for variability in ash accumulation rates within an aftertreatment element of an engine exhaust system is disclosed. The system includes at least one filter section within the aftertreatment element. The system also includes a controller configured to determine flow resistance values through the aftertreatment element, track minimum flow resistance values over time, correlate the tracked minimum flow resistance values over time, with a model of engine oil consumption rate that is based on predetermined values for model engine oil consumption, and adjust the predetermined values based on the tracked minimum flow resistance values over time.

In still another exemplary embodiment of the present disclosure, a machine comprises an engine system including an exhaust system. The machine also includes an aftertreatment element, including at least one filter section, in the exhaust system. The machine further includes a control system including a controller. The controller is configured to determine flow resistance values through the aftertreatment element, track minimum flow resistance values over time, correlate tracked minimum flow resistance value over time with a model of engine oil consumption rate that is based on predetermined values for model engine oil consumption, and adjust the predetermined values based on the tracked minimum flow resistance values over time.

DETAILED DESCRIPTION

Figure 1:
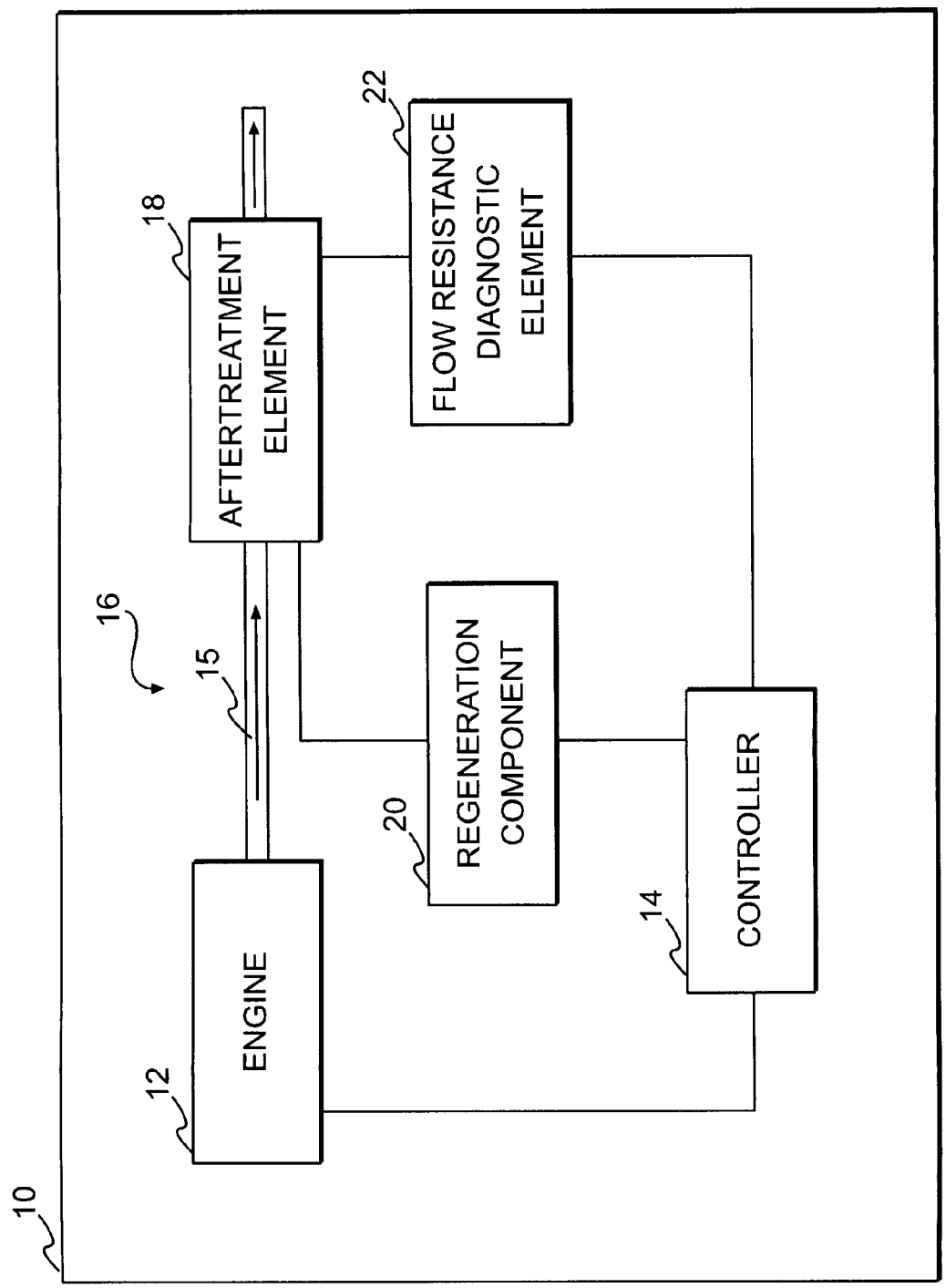
FIG. 1 is a diagrammatic and schematic illustration of a machine including a system according to an exemplary embodiment of the present disclosure.

A machine 10, in which exemplary disclosed embodiments may be implemented, is diagrammatically represented in FIG. 1. Machine 10 may be any of various machines, including an on-highway truck, an off-highway haulage unit, an excavating machine, a material handling machine, a stationary power generating machine, any of various heavy equipment machines, or any other machine which may benefit from implementation of embodiments according to the disclosure.

An engine 12 may be associated with machine 10. Engine 12 may be any one of various types of engines, such as, a gasoline fueled engine, a diesel fueled engine, or a gas fueled engine. A controller 14 may be part of a control system associated with machine 10 and engine 12. Controller 14 may be programmed, via hardware, software, algorithms, etc., to monitor and control operation of engine 12, various components associate with engine 12, and/or other machine components.

Engine 12 may include an exhaust system 16. Exhaust system 16 may be employed to convey engine exhaust stream 15, including gases and particulate matter, from engine 12. The flow of exhaust stream 15 may be directed through an aftertreatment element 18 associated with exhaust system 16. Aftertreatment element 18 may be any of various components configured to treat the exhaust gases and/or remove particulate matter. For example, aftertreatment element 18 may be a particulate filter and/or a catalytic component. Exhaust system 16 also may include various unillustrated exhaust system components generally associated with an exhaust system.

In one exemplary embodiment, aftertreatment element 18 may include a particulate filter configured to remove particulate matter from the flow of exhaust stream 15. The particulate matter may include soot and ash. As engine 12 operates, particulate matter may accumulate within the aftertreatment element 18. As the quantity of particulate matter increases beyond a certain amount, the pressure differential and resistance to flow across the aftertreatment element 18 may increase. This increase in pressure differential and resistance to flow, indicating a build-up of particulate matter within the aftertreatment element 18, may adversely affect engine operation and decrease the effectiveness of the aftertreatment element 18 in treating exhaust.

As a general rule, the largest component of particulate matter that accumulates in aftertreatment element 18 will be soot. Soot, which essentially is unburned carbon particles, may be consumed and removed from the aftertreatment element 18 during a regeneration cycle that may be initiated by regeneration component 20. Regeneration component 20, illustrated diagrammatically in FIG. 1, may be any of various components and/or systems that consume and remove soot. For example, regeneration component 20 may be of the type that increases the temperature within aftertreatment element 18 sufficiently to effectively burn the soot away. However, the ash component of particulate matter within aftertreatment element 18 is substantially incombustible, and may remain within the aftertreatment element 18 after a regeneration cycle.

A new or recently serviced aftertreatment element 18, e.g., particulate filter, may not be significantly affected by ash accumulation. Heavy machine use and/or other factors may prompt an engine 12 to generate enough soot to require regeneration of the aftertreatment element 18 within a short period of time, e.g., a matter of hours. The relatively small quantity of ash that may be generated during the same time may be insignificant. It may take much longer for enough ash to accumulate to adversely affect engine operation or efficiency of the aftertreatment element 18. Over time, however, as the quantity of ash accumulates, the aftertreatment element 18 may require servicing to remove the ash.

Regeneration component 20 may be configured to operate periodically. For example, controller 14 may be configured to initiate a regeneration cycle by regeneration component 20 on a timed basis, e.g., after a predetermined number of hours of engine operation. Alternatively, or additionally, regeneration component 20 may be configured to operate responsive to a diagnostic component configured to ascertain when aftertreatment element has accumulated an amount of particulate matter sufficient to implicate regeneration.

FIG. 1 diagrammatically illustrates a flow resistance diagnostic element 22 that may determine resistance to flow through the aftertreatment element 18. For example, the flow resistance diagnostic element 22 may include pressure measuring elements located upstream and downstream of aftertreatment element 18 and configured to yield data indicative of a pressure drop across the aftertreatment element 18. In an exemplary embodiment, when flow resistance reaches a value above a predetermined value, as determined by flow resistance diagnostic element 22, for example, controller 14 may initiate a regeneration cycle by regeneration component 20. It will be apparent that other diagnostic elements, know in the art and capable of ascertaining data reflective of particulate matter accumulation in aftertreatment element 18, may be employed in lieu of and/or in addition to flow resistance diagnostic element 22.

Engine 12 may have known characteristics based, for example, on laboratory and/or field tests and/or a history of engine operation. For example, it may be known how much soot engine 12 may produce when subjected to various speeds, loading, and operating conditions. In an exemplary embodiment, the known characteristic of how much soot engine 12 may produce under various speeds, loadings, and operating conditions may be reduced to an on-board model associated with controller 14. As a result, controller 14 may employ the on-board model in association with diagnostic data from actual, real time engine operation to predict soot accumulation within aftertreatment element 18.

Another example of a characteristic of engine 12 that may be known, e.g., from laboratory and/or field tests and/or a history of engine operation, is how much oil may be consumed by the engine based on various engine speeds, loadings, and operating conditions. Ideally, an engine, such as engine 12, would consume only fuel (i.e., a fuel/air mixture, or, in some cases, a fuel/air/exhaust gas mixture), leaving engine lubricating oil to perform its intended purpose outside the combustion chambers of the engine. In practice, however, a quantity of engine lubricating oil makes it way from within the crankcase, and from flow paths within the engine for which the lubricating oil is intended, into the engine combustion chambers. This unavoidable passage of oil into the engine combustion chambers may be, for example, via piston rings, via seals around intake and/or exhaust valve stems, and/or through any crankcase ventilation system that may be present. Oil, once it has made its way into engine combustion chambers, may be consumed during the combustion cycle, and the combustion components of the oil may pass along with exhaust stream 15 through aftertreatment element 18.

Based, for example, on laboratory and/or field tests and/or a history of operation of engine 12, in an exemplary embodiment, the known characteristic of how much engine lubricating oil engine 12 may consume under various speeds, loadings, and operating conditions is reduced to an on-board model associated with controller 14. As a result, controller 14 may employ the on-board model in association with diagnostic data from actual, real time engine operation to predict how much engine lubricating oil engine 12 will consume. Engine oil consumption implicates efficiency of aftertreatment element 18 since compositions for engine oil include components which make up ash. Various engine oil compositions include known or ascertainable quantities of ash.

In an exemplary embodiment, the on-board model of oil consumption rate may be based on predetermined values of consumption of the engine lubricating oil specified for the engine, with the ash content of the oil known. Accordingly, since the amount of oil consumed in a properly operating engine may be known, and since the ash content of the consumed oil may be know, the amount of ash accumulating in aftertreatment element 18 may be determined for the properly operating engine. However, when a machine 10 is operated under real world conditions, engine 12 may be subject to variance from model behavior. Anomalies that may be characterized as "engine system failures," for example, may alter oil consumption from the model. For example, piston rings may permit more oil to enter the engine combustion chambers. This may occur, for example, as the engine ages.

During operation, regeneration of aftertreatment element 18 may occur periodically. Flow resistance diagnostic element 22 may detect a flow resistance value after each regeneration cycle. As ash accumulates in the aftertreatment element 18, the flow resistance value derived just after a regeneration cycle may tend to increase somewhat, reflecting the failure of the regeneration process to consume incombustible ash. This flow resistance value, derived just after a regeneration cycle, when soot has been substantially consumed and the aftertreatment element 18 has been "regenerated" to a substantially clean condition, may be characterized as the "minimum flow resistance value." That is to say, flow resistance values will tend to rise from a time just after regeneration until the next regeneration cycle begins. Because the ash is not consumed during regeneration, it will be appreciated that the minimum flow resistance value will tend to increase over time due to the increased resistance to flow that results from increasing accumulated ash. Tracking the minimum flow resistance values with time yields an indication of ash accumulation.

Controller 14 is configured to adjust the predetermined values of the model of oil consumption upwardly based on the minimum flow resistance values that are tracked with time. Accordingly, if there is an engine system failure resulting in high oil consumption, and hence high ash accumulation rates, adjustment of the model of oil consumption upwardly permits controller 14 to compensate by, for example, increasing the frequency of regeneration, increasing the length of a regeneration cycle, etc.

INDUSTRIAL APPLICABILITY

The disclosed embodiments may be used to facilitate effective and efficient engine operation and reduction of particulate matter emissions to the environment. Aftertreatment elements which may benefit from the disclosed embodiments may include those including any type of filters known in the art which are capable of trapping particulate matter and capable of being regenerated. For example, the disclosed embodiments find applicability in connection with particulate filters, including diesel particulate filters. The disclosed embodiments may be employed with advantage in various on-highway trucks, off-highway haulage units, excavating machines, material handling machines, stationary power generating machines, and any of various heavy equipment machines.

Figure 2:
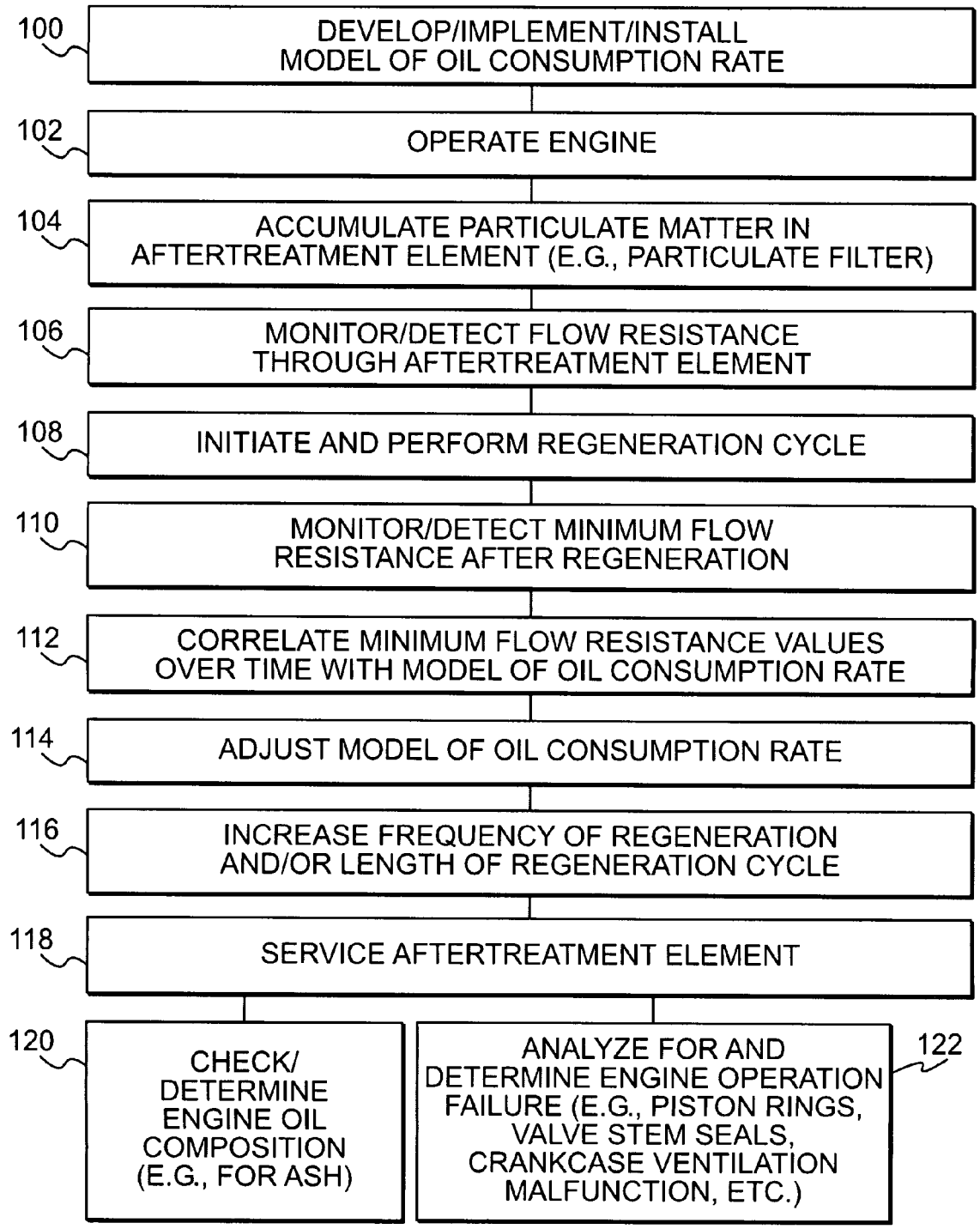
FIG. 2 is a diagram illustrating certain actions that may be included in exemplary embodiments of the present disclosure.

FIG. 2 illustrates schematically one possible exemplary implementation of a disclosed process and system in accordance with embodiments of the disclosure. While a certain sequence of events or actions may initially be implied by the schematic illustration of FIG. 2, it should be noted that it is within the scope of this disclosure that the sequence may be altered, that certain events or actions may not occur in the sequence, and that other events or actions, in addition to those discussed and illustrated, may occur.

Referring to the exemplary and schematic illustration in FIG. 2, at 100, a model of oil consumption rate for an engine 12 may be developed and installed on-board a machine 10. The model may be developed in various ways, including a history of experience with the particular type of engine, engine field tests, laboratory tests, etc. The model may provide a map of oil consumption rates at various speeds and/or loads and/or other engine operating conditions, for example. The model may be implemented/installed in controller 14 associated with machine 10 and engine 12.

Engine operation may begin, as indicated at 102, and may operate under various conditions (load, speed, etc.) depending on the type of machine 10 in which the engine 12 is employed and depending on the machine demands. During engine operation, various condition detecting devices, e.g., sensors, otherwise known in the art, may be employed to convey data to controller 14 that are relevant to engine operation. For example, controller 14 may receive data indicating actual engine speed, actual engine load, fuel consumption, etc. Also during engine operation, it is generally unavoidable that particulate matter (e.g., soot, ash, etc.) is generated during the process of combustion within the engine and exhausted from the engine in an exhaust stream.

As engine 12 operates and exhausts particulate matter in exhaust stream 15, the particulate matter may be deposited within and accumulate in aftertreatment element 18, at 104. Aftertreatment element 18 may include, for example, a particulate filter which, in the case where engine 12 is a diesel engine, is generally referred to as a diesel particulate filter (DPF). Aftertreatment element 18 also may include a separate or integral catalytic component which may, for example, be employed to enhance oxidation of particulate matter, or enhance conversion of potentially harmful emissions into relatively benign components.

While engine 12 operates and exhaust stream 15 flows through aftertreatment element 18, flow resistance diagnostic element 22 may be employed to suitably monitor and detect the resistance to flow across the aftertreatment element 18, at 106, and convey the measured result to controller 14. A "clean" aftertreatment element 18 that has not accumulated any substantial particulate matter may routinely offer a lower resistance to flow, while the resistance to flow may increase proportional to an increased accumulation of particulate matter. In other words, as the flow resistance diagnostic element 22 indicates and conveys to controller 14 an increased resistance to flow, controller 14 may readily convert (via hardware, software, algorithms, etc.) the flow resistance value to a particular level of particulate matter accumulation.

At some point in time after engine operation has begun and particulate matter has accumulated within aftertreatment element 18, controller 14 may initiate a regeneration cycle, at 108, to perform regeneration of aftertreatment element 18. Regeneration may occur in various ways, for example, by increasing the temperature within the aftertreatment element 18 sufficiently to consume accumulated soot, which ordinarily makes up the majority portion of the accumulated particulate matter. Regeneration may be initiated by controller 14 periodically, for example on a pre-programmed regular basis, regardless of any particular level of accumulated particulate matter within the aftertreatment element 18. Alternatively, or additionally, regeneration may be initiated by controller 14 responsive to an indication (e.g., by flow resistance diagnostic element 22) that particulate matter has accumulated to a predetermined maximum permissible level within aftertreatment element 18.

Upon termination of a regeneration cycle, aftertreatment element 18 may be returned to a relatively "clean" condition in the sense that soot may have been substantially consumed. At this point, flow resistance diagnostic element 22 may convey to controller 14 a minimum flow resistance value, at 110. In a new or recently serviced aftertreatment element 18, this minimum flow resistance value may be representative of the resistance to flow through aftertreatment element 18 when it is substantially free of accumulated particulate matter. However, in an aftertreatment element 18 that has been in service for a period of time, the minimum flow resistance value may have increased. This increase may represent the accumulation of incombustible ash within aftertreatment element 18 over time. Data for minimum flow resistance values may be conveyed to controller 14 for processing.

Controller 14 includes a model of oil consumption rate for the engine 12 as indicated at 100 in FIG. 2. The model relies on the premise that engine 12 is operating within the parameters of a properly running engine. That is to say, the model presumes engine 12 is consuming what may be deemed "normal," unavoidable quantities of ash-containing lubricating oil that may make its way into the engine combustion chambers. Controller 14 may process data received from flow resistance diagnostic element 22 regarding minimum flow resistance values over time through aftertreatment element 18, correlate the data with the model, at 112, and utilize the processed data to update the model. That is to say, as the minimum flow resistance values increase over time, the predetermined value for model oil consumption rate is adjusted upwardly, at 114, to compensate for the increased ash build-up within aftertreatment element 18 and the concomitant decrease in available volume for accumulating additional particulate material before the next regeneration cycle.

The indication of increasing ash accumulation with time, as reflected in the increased minimum flow resistance values conveyed to controller 14 by flow resistance diagnostic element 22, may permit controller 14 to predict particulate matter accumulation within aftertreatment element 18 and predict the remaining capacity for particulate matter accumulation with aftertreatment element 18 at any given time. In addition, adjustment of the model of oil consumption, reflective of an increased ash accumulation in aftertreatment element 18, may result in an increase in frequency of regeneration and/or the length of regeneration cycles, at 116, in compensation for any reduced capacity of aftertreatment element 18 for performing its intended function.

Controller 14, in adjusting model oil consumption rate upwardly as an indication of increased ash build-up, may indicate certain actions that advantageously may be taken. For example, the upward adjustment may, after a time, indicate that the aftertreatment element should be scheduled for service, for example when the minimum flow resistance value exceeds a predetermined maximum, before further use, both for maintaining engine operation efficiency and aftertreatment element efficiency. Accordingly, the aftertreatment element may be serviced, at 118. Additionally, upward adjustment may prompt a determination, for example in the form of a warning, indication, or displayed reading, that the particular engine oil composition employed in the engine is inappropriate, for example, due to high ash content. This may initiate checking to determine the composition of the engine oil being employed, including determining its ash content, at 120. At this point, it may be determined whether an engine associated with the exhaust system requires an engine oil having a composition including less ash. An inappropriately high ash content of the oil in use may implicate substituting an engine oil of a different composition.

Upward adjustment also may prompt a determination that an engine operation or system failure has occurred, at 122. Accordingly, it may be determined whether an engine associated with the exhaust system has incurred an engine failure associated with increased oil consumption. Such an engine failure, resulting in increased oil consumption and ash production could, for example, be faulty piston rings, permitting excessive amounts of engine oil to pass from the engine crankcase, past the piston, and into the engine combustion chambers. Such an engine failure also could be, for example, faulty seals around intake and/or exhaust valve stems, and/or improperly operating crankcase ventilation equipment.

Systems and methods have been described that will facilitate maintaining the efficiency of an aftertreatment element, such as a particulate filter, as well as maintaining engine operation efficiency. An effective manner for compensating for variability in ash accumulation rates and otherwise maintain particulate filter efficiency by accounting for ash accumulation has been disclosed. It will be apparent to those having ordinary skill in the art that various modifications and variations can be made to the disclosed methods and systems without departing from the scope of the disclosure.

Other embodiments will be apparent to those having ordinary skill in the art from consideration of the specification and practice of the disclosed embodiments. It is intended that the specification and examples be considered as exemplary only, with the true scope of protection being indicated by the following claims.

What is claimed is:

1. A method of compensating for variability in ash accumulation rates within an aftertreatment element of an engine exhaust system, comprising:
   determining flow resistance values through the aftertreatment element;
   tracking minimum flow resistance values over time;
   correlating the tracked minimum flow resistance values over time, with a model of engine oil consumption rate that is based on predetermined values for model engine oil consumption; and
   adjusting the predetermined values based on the tracked minimum flow resistance values over time.

2. The method of claim 1, wherein determining flow resistance values through the aftertreatment element includes determining flow resistance values through a particulate filter.

3. The method of claim 2, wherein the particulate filter accumulates particulate matter, further including initiating a regeneration cycle to remove at least a portion of the particulate matter from the particulate filter, and wherein tracking minimum flow resistance values over time includes tracking the minimum flow resistance values through the particulate filter after a regeneration cycle has been completed.

4. The method of claim 3, including tracking the minimum flow resistance values through the particulate filter after each of a plurality of regeneration cycles over time.

5. The method of claim 1, including scheduling the aftertreatment element for service when the minimum flow resistance value exceeds a predetermined maximum.

6. The method of claim 1, wherein adjusting the predetermined values based on the tracked minimum flow resistance values over time includes adjusting the predetermined values to higher values.

7. The method of claim 6, further including, responsive to adjusting the predetermined values to higher values, determining at least one of the following:
   whether an engine associated with the exhaust system requires an engine oil having a composition including less ash; and
   whether an engine associated with the exhaust system has incurred an engine failure associated with increased oil consumption.

8. The method of claim 1, wherein determining flow resistance values includes determining flow resistance values through a particulate filter having a catalytic component.

9. A system for compensating for variability in ash accumulation rates within an aftertreatment element of an engine exhaust system, comprising:
   at least one filter section within the aftertreatment element;
   a controller configured to:
      determine flow resistance values through the aftertreatment element;
      track minimum flow resistance values over time;
      correlate tracked minimum flow resistance values over time with a model of oil consumption rate that is based on predetermined values for model oil consumption; and
      adjust the predetermined values based on the tracked minimum flow resistance values over time.

10. The system of claim 9, wherein the controller is further configured to initiate a regeneration cycle for the aftertreatment element responsive to at least one of:
   a pre-programmed period of time; and
   a predetermined flow resistance value through the aftertreatment element.

11. The system of claim 9, wherein the controller is further configured to indicate when the aftertreatment element requires servicing.

12. The system of claim 9, wherein the aftertreatment element includes at least one catalytic component.

13. The system of claim 9, wherein the controller is configured to predict particulate matter accumulation within the aftertreatment element at least partially in response to determining flow resistance values through the aftertreatment element.

14. A machine, comprising:
   an engine including an exhaust system;
   an aftertreatment element, including at least one filter section, in the exhaust system;
   a control system including a controller, the controller configured to:
      determine flow resistance values through the aftertreatment element;
      track minimum flow resistance values over time;
      correlate tracked minimum flow resistance value over time with a model of engine oil consumption rate that is based on predetermined values for model engine oil consumption; and
      adjust the predetermined values based on the tracked minimum flow resistance values over time.

15. The machine of claim 14, wherein the aftertreatment element is configured to accumulate particulate matter contained in engine exhaust, and the controller is configured to periodically initiate a regeneration cycle to remove at least a portion of the particulate matter from the aftertreatment element.

16. The machine of claim 15, wherein the engine is a diesel engine and the aftertreatment element is a diesel particulate filter configured to accumulate particulate matter including at least soot and ash.

17. The machine of claim 16, wherein the diesel particulate filter has a predetermined capacity for accumulated particulate matter, including at least soot and ash, and wherein the soot is substantially consumed during a regeneration cycle, while ash continues to accumulate and decrease the capacity for accumulated particulate matter, and the controller is further configured to predict the remaining capacity for accumulated particulate matter.

18. The machine of claim 17, wherein the controller is configured to increase the frequency of regeneration cycles as the predicted remaining capacity for accumulated particulate matter decreases over time.

19. The machine of claim 18, wherein the controller is configured to indicate that the diesel particulate filter requires servicing when the predicted remaining capacity for accumulated particulate matter has decreased below a predetermined minimum.

20. The machine of claim 14, wherein the aftertreatment element includes a catalytic component and a particulate filter.

* * * * *